United States Patent
Kazmi et al.

(10) Patent No.: US 12,207,144 B2
(45) Date of Patent: Jan. 21, 2025

(54) USER EQUIPMENT POSITIONING MEASUREMENTS UNDER CELL CHANGE

(71) Applicant: TELEFONAKTIEBOLAGET LM ERICSSON (PUBL), Stockholm (SE)

(72) Inventors: Muhammad Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 350 days.

(21) Appl. No.: 17/774,396

(22) PCT Filed: Nov. 5, 2020

(86) PCT No.: PCT/IB2020/060428
§ 371 (c)(1),
(2) Date: May 4, 2022

(87) PCT Pub. No.: WO2021/090237
PCT Pub. Date: May 14, 2021

(65) Prior Publication Data
US 2022/0408337 A1   Dec. 22, 2022

Related U.S. Application Data (60) Provisional application No. 62/932,983, filed on Nov. 8, 2019.

(51) Int. Cl.
*H04W 36/00* (2009.01)
*G01S 5/00* (2006.01)
(Continued)

(52) U.S. Cl.
CPC ....... *H04W 36/0058* (2018.08); *G01S 5/0063* (2013.01); *H04L 5/0051* (2013.01); *H04W 36/322* (2023.05)

(58) Field of Classification Search
None
See application file for complete search history.

(56) References Cited

U.S. PATENT DOCUMENTS

2012/0327797 A1    12/2012  Siomina
2014/0200016 A1*   7/2014   Siomina ............... H04W 24/08
                                                  455/450
(Continued)

FOREIGN PATENT DOCUMENTS

EP          2835018 B1      12/2017
WO      2018083630 A1       5/2018

OTHER PUBLICATIONS

Ericsson, "On early measurements reporting in NR", 3GPP Draft; R4-1912081 On Early Measurements Reporting in NR V2, 3rd Generation Partnership Project (3GPP), Mobile Competence Centre ; 650, Route Des Lucioles ; F-06921 Sophia-Antipolis Cedex ; FRANCE.

(Continued)

*Primary Examiner* — Derrick W Ferris
*Assistant Examiner* — Keith Follansbee (57) ABSTRACT

A method performed by a UE (102) that is being served by at least a first cell. The method includes the UE performing a multi round-trip-time, multi-RTT, positioning measurement (e.g., a UE Rx-Tx measurement), wherein the UE is configured with SRS for the measurement with respect to a second cell. The method also includes the UE detecting a need to change a serving cell. The method further includes, as a result of detecting the need to change a serving cell, the UE deciding whether to restart or continue performing the multi-RTT measurement. The UE is configured such that the UE continues the multi-RTT measurement if the serving cell change is for a cell different than the second cell in which the UE is configured with the SRS for the measurement).

9 Claims, 6 Drawing Sheets

(51) Int. Cl.
　　　*H04L 5/00*　　　　(2006.01)
　　　*H04W 36/32*　　 (2009.01)

(56) References Cited

U.S. PATENT DOCUMENTS

2020/0280947 A1\*　9/2020　Dinan ................. H04W 74/004
2022/0077981 A1\*　3/2022　Duan ................. G01S 5/02213

OTHER PUBLICATIONS

Ericsson, "On UE Rx-Tx measurements", 3GPP Draft; R4-2001940, 3rd Generation Partnership Project (3GPP), Mobile Competence Centre ; 650, Route Des Lucioles ; F-06921 Sophia-Antipolis Cedex ; France.

\* cited by examiner

USER EQUIPMENT POSITIONING MEASUREMENTS UNDER CELL CHANGE

This application is a 371 of International Application No. PCT/IB2020/060428, filed Nov. 5, 2020, which claims the benefit of U.S. Provisional Application No. 62/932,983, filed Nov. 8, 2019, the disclosures of which are fully incorporated herein by reference.

TECHNICAL FIELD

This disclosure relates to UE positioning measurements.

BACKGROUND

Figure 1:
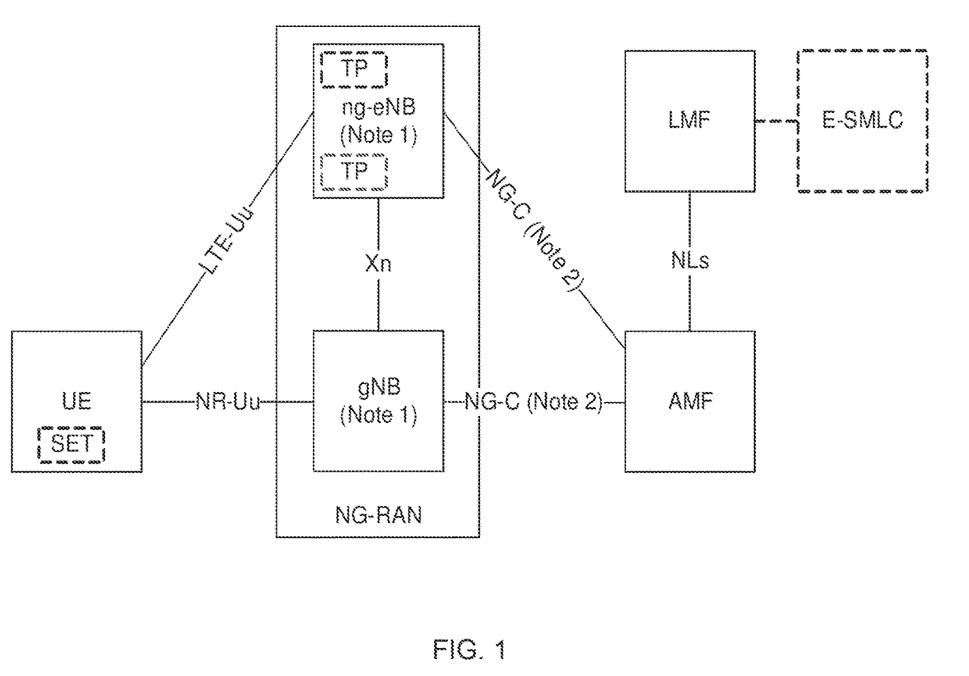
FIG. 1 illustrates the NR architecture.

The New Radio (NR) (a.k.a. 5G or Next Generation) architecture is being discussed in 3GPP and a current concept is illustrated in FIG. 1, which shown an NG Radio Access Network (NG-RAN) having a gNB and a ng-eNB (or evolved eNB), which denote NR base stations (BSs) (one NR BS may correspond to one or more transmission/reception points, TRPs), and the lines between the nodes illustrate the corresponding interfaces. In some scenarios, the NG-RAN includes only one of the gNB or the ng-eNB. When both the gNB and the ng-eNB are present, then the NG-C interface is only present for one of them.

The Location Management Function (LMF) is a location node in NR. There are also interactions between the location node and the gNB via the NR Positioning Protocol A (NRPPa) protocol (not illustrated in FIG. 1) and between UE and the location server via NR LTE Positioning Protocol (LPP). The interactions between the gNB and the UE is supported via the Radio Resource Control (RRC) protocol.

NR Positioning Measurements

In 3GPP positioning methods and measurements for release 16 (Rel-16) NR are currently being discussed and the proposed methods and measurements are summarized in the tables below:

| DL/UL Reference Signals | UE Measurements | To facilitate support of the following positioning techniques |
|---|---|---|
| Rel.16 DL PRS | DL RSTD | DL-TDOA |
| Rel.16 DL PRS | DL PRS RSRP | DL-TDOA, DL-AoD, Multi-RTT |
| Rel.16 DL PRS/ Rel.16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | E-CID |

| DL/UL Reference Signals | gNB Measurements | To facilitate support of the following positioning techniques |
|---|---|---|
| Rel.16 SRS for positioning | UL RTOA | UL-TDOA |
| Rel.16 SRS for positioning | UL SRS-RSRP | UL-TDOA, UL-AoA, Multi-RTT |
| Rel.16 SRS for positioning, Rel.16 DL PRS | gNB Rx-Tx time difference | Multi-RTT |
| Rel.16 SRS for positioning, | AoA and ZoA | UL-AoA, Multi-RTT |

The table below contains RAN 1 agreements on positioning reference signal (PRS) configuration:

---

Start PRB parameter for DL PRS configuration has granularity of one PRB with a minimum of 0 and a maximum of [2176] PRBs
4 PRB granularity is used for DL PRS BW configuration
Maximum BW for DL PRS in PRBs does not exceed 272 PRBs
Minimum BW for DL PRS in PRBs is not less than 24 PRBs
At least the following DL PRS RE patterns, with comb size N equal to number of symbols M are supported (figures for information)
Comb-2: Symbols {0, 1} have relative RE offsets {0, 1}
Comb-4: Symbols {0, 1, 2, 3} have relative RE offsets {0, 2, 1, 3}
Comb-6: Symbols {0, 1, 2, 3, 4, 5} have relative RE offsets {0, 3, 1, 4, 2, 5}
The following periodicity values for periodicity of DL PRS allocation are supported:
P = {4, 8, 16, 32, 64, 5, 10, 20, 40, 80, 160, 320, 640, 1280, 2560, 5120, 10240, 20480} slots
20480 is not supported for an SCS of 15 kHz
FFS: Further restrictions on values applicable to different SCS.

---

Multi-RTT Positioning

Multi-RTT is a positioning method to be supported in NR based on UE Rx-Tx time difference and PRS RSRP measurements.

As can be seen above, the following measurements can be configured for multi-RTT positioning: UE Rx-Tx, gNB Rx-Tx, and PRS reference signal received power (RSRP). PRS RSRP may also be used for Observed Time Difference Of Arrival (OTDOA).

UE Rx-Tx is a bidirectional timing measurement comprising the difference between the two measurement components: 1) receive timing of a DL transmission, and 2) uplink (UL) transmit timing.

In LTE, UE Rx-Tx exists only for the UE PCell and only based on CRS (in downlink (DL)) and sounding reference signal (SRS) or Physical Random Access Channel (PRACH) (in uplink (UL)) in the same cell.

In NR, UE Rx-Tx is not limited to serving cells and can also be with respect to intra-frequency or inter-frequency neighbor cells (in DL) or between two serving cells (DL in one cell and UL in another cell).

Related RAN1 agreements for Rel-16 NR are shown in the tables below:

---

RAN1#98-bis:

Working assumption:
A UE can be configured to report multiple Rx-Tx time difference measurements corresponding to a single SRS resource/resource set for positioning with each measurement corresponding to a single DL PRS resource/resource set. The DL PRS resource/resource sets can be in different positioning frequency layers
FFS: Reporting of SRS for positioning resource/resource set ID corresponding to a UE Rx-Tx time difference measurement
Note: This agreement does not introduce any new behavior for the transmission of SRS for positioning.
Conclusion:
UE may select a subset of the DL PRS Resource/Resource sets configured by the network to perform and report requested measurements.

---

RAN1#98:

Agreement:
UE Rx-Tx time difference is defined with respect to the Rx and Tx subframe timing associated with the TRP
Multiple DL PRS resources can be used to determine the received DL subframe timing of the first arrival path of the TRP.

| RAN1#98: |
| --- |
| At least the PRS resource ID(s) or PRS resource set ID(s) used for determining the timing of each TRP in the UE Rx-Tx time difference measurements can be configured for reporting in the measurement report. Note: This does not preclude the use of any additional reference signals that are being discussed further including existing reference signals<br>Agreement:<br>For transmission timing of the SRS for positioning purposes, the TA configuration is based only on the serving cell (i.e., the TA value applied to the corresponding UL symbol is the same as the latest TA for regular UL symbols). (Option 1 from previous related agreement in RAN1#96bis).<br>Options 2/3 (from previous related agreement in RAN1#96bis) may be further considered if improvements of gNB measurement accuracy can be demonstrated and if it can be shown that the interference to the serving cell can be handled in the system.<br>FFS: whether the application of the TA command at the UE impacts the feasibility of each of the options.<br>FFS: whether UE autonomous TA adjustments impacts the feasibility of each of the options. |

| RAN1#97: |
| --- |
| Agreement:<br>Support inter-frequency DL PRS-RSRP measurements for NR positioning in Rel-16 when the UE is in RRC_CONNECTED state. |

SUMMARY

For LTE, the UE behavior under cell change while the UE is performing UE Rx-Tx time difference measurement w.r.t the serving cell (i.e., both signal RX and signal TX are in the serving cell) is specified in section 8.1.2.7, of 3GPP TS 36.133 v16.3.0 ("TS 36.133"), according to which if the UE is performing the UE Rx-Tx time difference measurement while the PCell is changed due to the cell change (e.g. handover) then the UE restarts the UE Rx-Tx measurement in the new cell. The UE Rx-Tx time difference measurement period is extended based on at least the number of times the PCell is changed over the measurement period and cell change duration.

However, the UE behavior under cell change while the UE is performing multi-RTT positioning measurements (UE Rx-Tx and PRS-RSRP) is not known. The current UE behavior under cell change (defined for UE Rx-Tx measurement) cannot be applied to the multi-RTT positioning measurements where the measurements are not limited to PCell for both DL and UL components. Otherwise the positioning measurement performance will severely degrade. The UE may even abort the on-going positioning session. Therefore a new solution is required for multi-RTT positioning measurement under cell change procedure.

Consider a UE that is performing one or more multi-RTT measurements (e.g., UE Rx-Tx with or without a second measurement, e.g., PRS-RSRP or PRS-RSTD) on DL and/or UL signals of at least one serving cell (cell1) and at least one other cell (cell2) and is then configured to perform a cell change on cell1 or on a cell used as a reference to derive the UL transmit timing for the UL component of the UE Rx-Tx measurement. In this case, in one embodiment, the UE performs the multi-RTT positioning measurement(s) on cell1 according a first procedure (denoted P1) and performs the multi-RTT positioning measurement(s) on cell2 according a second procedure (denoted P2).

According to P1, the UE restarts the multi-RTT positioning measurement(s) (e.g. PRS-RSRP or UE RX–TX time difference measurement with at least one its component measured on cell1) after each cell change procedure. In this case, the physical layer measurement period of the multi-RTT positioning measurement on cell1 is extended based on at least a number of times (K) the cell change occurs over the RTT's physical layer measurement period and K times the duration of each cell change (Tcc).

According to P2, the UE continues performing the ongoing multi-RTT positioning measurement(s) (e.g. PRS-RSRP or UE RX–TX time difference measurement with at least one its component measured on cell2) after each cell change procedure. In this case the physical layer measurement period of the RTT measurement on cell1 is extended based on K times the duration of each cell change (Tcc).

According to another embodiment, a UE configured with two types of measurements for multi-RTT (e.g., UE Rx-Tx and PRS-RSRP or UE Rx-Tx and Reference Signal Time Difference (RSTD)) determines for a first measurement type (e.g., UE Rx-Tx) the applicable procedure under a cell change according to the rules above and applies the same procedure for the second measurement type (e.g., PRS-RSRP or RSTD). In another embodiment, the first measurement type can be the one with more strict rules at cell change (e.g., can continue in a fewer scenarios or in a subset of scenarios where the second type of the measurement can be continued).

According to yet another embodiment, a UE is configured with PRS-RSRP and a cell change occurs during the measurement period. If the measurement is configured without UE Rx-Tx (e.g., not in the same assistance data or not at all during the PRS-RSRP measurement period), then the PRS-RSRP measurement can continue if the cell change does not concern the measured cell, otherwise the measurement can be restarted. For example, the measured cell was intra-frequency and/or no gaps were needed, while after the cell change the measured cell became inter-frequency and/or gaps are needed—in this case the measurement needs to be restarted and may need to be performed in measurement gaps which need to be also configured for the UE after the cell change (the UE may also need to send a request for the measurement gaps after the cell change).

In some embodiments, the UE uses the results of the performed multi-RTT positioning measurement(s) for one or more operational tasks.

In one aspect there is provided a method performed by a UE that is being served by at least a first cell. The method includes the UE performing a multi round-trip-time, multi-RTT, positioning measurement (e.g., a UE Rx-Tx measurement), wherein the UE is configured with sounding reference signal (SRS) for the measurement with respect to a second cell. The method also includes the UE detecting a need to change a serving cell. The method further includes, as a result of detecting the need to change a serving cell, the UE deciding whether to restart or continue performing the multi-RTT measurement. The UE is configured such that the UE continues the multi-RTT measurement if the serving cell change is for a cell different than the second cell in which the UE is configured with the SRS for the measurement.

In another aspect there is provided a method performed by a UE. The method includes the UE performing a positioning measurement and detecting a need to change a serving cell. As a result of detecting the need to change a serving cell, the UE decides whether or not to continue with the measurement.

In another aspect there is provided another method performed by a UE that is being served by at least a first cell (cell1). The method includes the UE obtaining configuration information configuring the UE to perform at least a first multi round-trip-time, multi-RTT, positioning measurement procedure involving at least a first positioning measurement, M1, with respect to cell1 and a second positioning measurement, M2, with respect to a second cell, cell2. The method also includes the UE, while performing the first multi-RTT positioning measurement procedure, obtaining cell change information indicating that a cell change is required, wherein the cell change comprises changing a serving cell of the UE. The method further includes, as a result of obtaining the cell change information, the UE adapting the first multi-RTT positioning measurement procedure, wherein adapting the first multi-RTT positioning measurement procedure comprises: i) restarting the first positioning measurement, M1; and ii) continuing the second positioning measurement, M2.

In another aspect there is provided a computer program comprising instructions which when executed by processing circuitry causes the processing circuitry to perform any one of the method provided herein. In one embodiment, there is provided a carrier containing the computer program, wherein the carrier is one of an electronic signal, an optical signal, a radio signal, and a computer readable storage medium.

In another aspect there is provided a UE that is adapted to perform any one of the method disclosed herein. In some embodiments, the UE includes a memory comprising instructions and processing circuitry coupled to the memory for executing the instructions.

A significant advantage of the embodiments provided herein is that the UE is able to continue performing the positioning measurement and also meet the positioning requirements when serving cell is changed. Additionally, the embodiments define UE behaviors when the serving cell is changed while the UE doing the multi-RTT positioning measurement. This enables a network node (e.g. a positioning node) to interpret measurement results reported by the UE. Furthermore, the embodiments enable the network node (e.g. positioning node) to be aware of the measurement time required by the UE under cell change.

DETAILED DESCRIPTION

1. Terminology

In this disclosure the term "node" is used which can be a network node or a user equipment (UE). Examples of network nodes are NodeB, base station (BS), multi-standard radio (MSR) radio node such as MSR BS, eNodeB, gNodeB, MeNB, SeNB, integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, RRU, RRH, nodes in distributed antenna system (DAS), core network node (e.g. MSC, MME etc), O&M, OSS, SON, positioning node (e.g. E-SMLC), etc.

The term user equipment (UE) refers to any type of device capable of wirelessly communicating with a network node and/or with another UE in a cellular or mobile communication system. Examples of a UE are target device, device to device (D2D) UE, vehicular to vehicular (V2V), machine type UE, MTC UE or UE capable of machine to machine (M2M) communication, PDA, Tablet, mobile terminals, smartphone, laptop embedded equipment (LEE), laptop mounted equipment (LME), USB dongles, etc.

In some embodiments, generic terminology, "radio network node" or simply "network node (NW node)", is used. It can be any kind of network node which may comprise base station, radio base station, base transceiver station, base station controller, network controller, evolved Node B (eNB), Node B, gNodeB (gNB), relay node, access point, radio access point, Remote Radio Unit (RRU) Remote Radio Head (RRH), Central Unit (e.g. in a gNB), Distributed Unit (e.g. in a gNB), Baseband Unit, Centralized Baseband, C-RAN, access point (AP etc.

The term radio access technology (RAT) may refer to any RAT (e.g. UTRA, E-UTRA, narrow band internet of things (NB-IoT), WiFi, Bluetooth, next generation RAT, New Radio (NR), 4G, 5G, etc). Any of the equipment denoted by the terms node, network node or radio network node may be capable of supporting a single or multiple RATs.

The term signal or radio signal used herein can be any physical signal or physical channel. Examples of DL physical signals are reference signal such as primary synchronization signal (PSS), secondary synchronization signal (SSS), channel-state-information reference signal (CSI-RS), demodulation reference signal (DMRS), synchronization signal block (SSB), DRS, CRS, PRS etc. Examples of uplink (UL) physical signals are reference signal such as sounding reference signal (SRS), DMRS etc. The term physical channel (e.g., in the context of channel reception) used simply channel contains higher layer information. Examples of physical channels are PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH, etc.

The term time resource used herein may correspond to any type of physical resource or radio resource expressed in terms of length of time. Examples of time resources are: symbol, time slot, subframe, radio frame, transmission time interval (TTI), interleaving time, slot, sub-slot, mini-slot, etc.

The term multi-round trip time (multi-RTT) positioning measurement used herein correspond to any UE measurement comprising at least one multi-RTT positioning measurement on signals of one serving cell or TRP (e.g. PCell, PSCell etc) and at least one multi-RTT positioning measurement on signals of another cell or TRP (e.g. a neighbor cell, another serving cell etc). Examples of multi-RTT positioning measurements are UE RX–TX time difference measurement, timing advance, PRS-RSRP, etc.

2. Embodiments

2.1 Scenario

Figure 2:
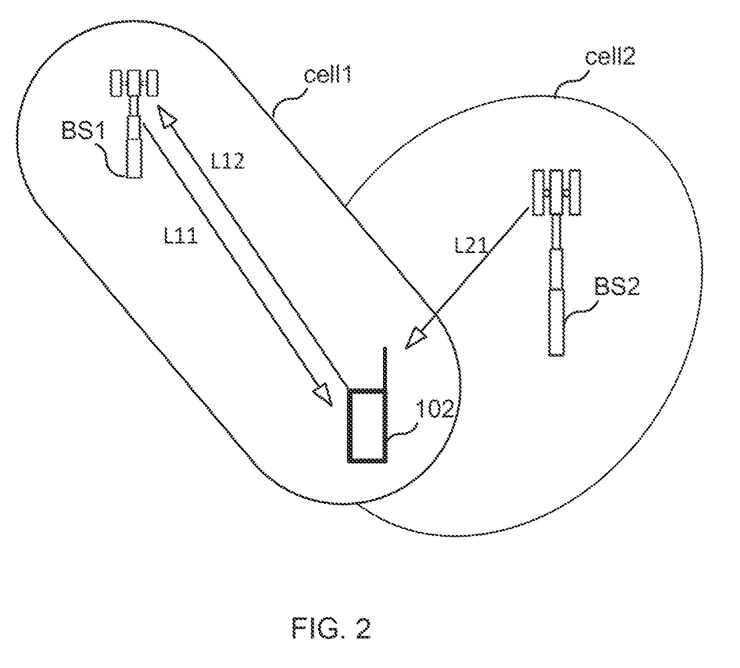
FIG. 2 illustrates a scenario where a UE is served by a first cell and is configured to perform one or more multi-RTT positioning measurement.

FIG. 2 illustrates a scenario where a UE 102 is served by a first cell (cell1) and is configured to perform one or more multi-RTT positioning measurement(s), which involves a measurement on signals of at least two cells: cell1 and cell2. Cell1 may also be referred to as a special cell (SpSCell) (e.g. PCell, PSCell etc.). In one example, cell2 is non-serving cell. In another example cell2 is also a serving cell (e.g. cell1 and cell2 are PCell and SCell respectively in CA, or cell1 and cell2 are PCell and PSCell respectively in dual connectively, etc.).

The multi-RTT positioning measurement comprises the UE 102 performing a first measurement (M1) on signals of cell1 and at least a second measurement (M2) on signals of cell2.

An example of M1 comprises UE RX−TX difference measurement performed by the UE.

One example of M2 also comprises UE RX−TX time difference measurement performed by the UE. Another example of M2 comprises UE measuring reception (RX) time of signals received from cell2. As an example the UE measures or estimates the RX time of a downlink reference signal (DRS) transmitted by a cell. Examples of DRS are PRS, channel state information (CSI) RS (CSI-RS), SSB, demodulation reference signal (DMRS) etc. Also as an example the UE measures or estimates the TX component of the UE RX−TX difference measurement for a cell on a uplink (UL) reference signal (URS) transmitted by the UE in that cell. Examples of URS are sounding reference signal (SRS), DMRS etc.

The embodiments are described for the multi-RTT positioning measurement performed on signals of two cells. However, the embodiments are applicable for any number of cells involved for performing the multi-RTT positioning measurements. For example the UE may be configured to perform multi-RTT positioning measurement on signals of N cells e.g. cell1, cell2, . . . , $cell_N$. The corresponding measurements on cell1, cell2, . . . , $cell_N$ are denoted by M1, M2, . . . , $M_N$ respectively.

The cells, cell1, cell2, . . . , $cell_N$ may be managed or served by the same network node or by different network nodes. The UE is configured to performed to the multi-RTT measurement based on a configuration message received from a node. Examples of the node are base station (e.g. serving BS), positioning node etc.

An example of the arrangement for the UE performing multi-RTT positioning measurement on signals of cell1 and cell2 is shown in FIG. 2. BS1 and BS2 denotes radio nodes serving or managing cell1 and cell2, respectively. In cell1 the links L11 and L12 are used to transmit the DRS (e.g. PRS) in DL by BS1 and URS (e.g. SRS) in UL by the UE, respectively. In cell2, the link L21 is used to transmit the DRS (e.g. PRS) in DL by BS2.

2.2 Method in UE 102 of Adapting Multi-RTT Procedure Under Change

The UE 102 is configured to perform multi-RTT positioning measurement(s) on signals of at least cell1 and cell2. The UE, while performing the multi-RTT positioning measurement, is configured to perform a cell change. The cell change comprises at least changing one serving cell of the UE (e.g. changing the current serving cell to a target cell). The UE can be configured to perform the cell change based on autonomous decision by the UE or based on receiving a configuration message from a network node (e.g. from the serving BS).

Examples of cell change procedure include: cell reselection, RRC connection release with redirection, RRC re-establishment, handover (or PCell change), PSCell change, SCell change or switching, a change in a set of serving cells (e.g., addition/release of PSCell or SCell or (de)activation of SCells), or change of the reference cell used to derive the timing of an UL transmission (one of the components of UE Rx-Tx) of the measurement even if the cell of the UL transmission is not changed (e.g., UE Rx-Tx is performed based on UL transmission in an SCell and uses another cell as a reference for deriving its UL transmit timing which may be e.g. PCell in PCG, PSCell in PSCG, or SCell in an SCG, but not using it for UL transmission or DL reception for the UE Rx-Tx measurement).

According to one embodiment, while the UE is performing the multi-RTT positioning measurement, the cell change procedure triggers the UE to adapt the ongoing multi-RTT positioning measurement procedure, and the adaptation of the multi-RTT positioning measurement procedure comprises: (1) Performing the multi-RTT positioning measurement on a first group of cells (G1) according to a first measurement procedure (P1); and (2) Performing the multi-RTT positioning measurement on a second group of cells (G2) according to a second measurement procedure (P2).

The groups G1 and G2 are defined below.

The G1 comprises at least one cell which has been changed or is being changed by the UE and which is used by the UE to derive its UL transmit timing or in which the UE is configured to receive DRS for measuring the RX time component and to transmit URS for measuring the transmission (TX) time component of the UE RX−TX time difference measurement. Specific examples of G1 cells include: SpCell (e.g. PCell, PSCell), bidirectional SCell (e.g. SCell with both DL and UL), and SCell in SCG used as a reference by the UE for deriving its UL timing while the UE may be not performing the multi-RTT positioning measurement on this SCell. For example, the M1 measurement by the UE using signals of cell1, which belongs to G1, comprising:

--- measuring the RX time at the UE of PRS transmitted by cell1,
for UE Rx-Tx, measuring the TX time at the UE of SRS transmitted by the UE in cell1 and
estimating the RX-TX time difference measurement based on the RX time and TX time measured wrt cell1, or
Using signals of cell1 as a reference for determining the UE UL transmit timing for the UE Rx-Tx measurement (M1 is in not measured as such on cell1 but cell1 is still measured to determine UL transmit timing for M1), and
The UL transmit timing change due to the cell change is above a threshold.

---

The G2 comprises at least one cell in which the UE is configured to only receive DRS for measuring the RX time component of the multi-RTT positioning measurement (e.g., UE RX−TX time difference measurement or PRS-RSRP). Specific examples of G2 cells are non-serving cell (e.g. neighbor cell), DL only SCell (e.g. SCell without UL). For example the M2 measurement by the UE using signals of cell2, which belongs to G2, comprising:

--- measuring the RX time at the UE of PRS transmitted by cell2, and
for UE Rx-Tx measurement, estimating the RX-TX time difference -continued measurement based on the RX time measured wrt cell2 and TX time measured wrt cell1, or
Using signals of cell1 as a reference for determining the UE UL transmit timing for the UE Rx-Tx measurement (M1 is in not measured as such on cell1 but cell1 is still measured to determine UL transmit timing for M1), and
The UL transmit timing change due to the cell change is below a threshold (e.g., 0 or relatively small in a special case)

P1 may further apply when the cell change is to another carrier frequency or to an inter-frequency, while P2 may further apply when the cell change is within the same carrier frequency.

According to the first procedure, P1, applied on G1 cell(s), the UE upon cell change, restarts the multi-RTT positioning measurement on the G1 cell(s) (e.g. restart the M1 measurement being performed on cell1). According to another aspect, the UE restarts the M1 measurement due to each cell change procedure. In this case the physical layer measurement period (T1) over which the UE performs the M1 measurement is extended from T1 to T1'. The extended T1 (i.e., T1') depends on a number of times (K) the cell change occurs over the physical layer measurement period of M1. T1' further depends on at least K times the duration ($T_{CC}$) of each cell change. For example, if T1 is the physical layer measurement period of M1 when no cell change occurs during T1, then T1' can be expressed as: T1'=f(K, T1, $T_{CC}$). In a specific embodiment, T1' is expressed as: T1'=(K+1)*T1+K*$T_{CC}$.

According to the second procedure, P2, applied on G2 cell(s), the UE upon cell change, continues on the going multi-RTT positioning measurement on the G2 cell(s) (e.g., the M2 measurement being performed on cell2 is continues also after the cell change). In this case, the physical layer measurement period (T2) over which the UE performs the M2 measurement is also extended from T2 to T2'. However, the extended T2 (T2') is based on K times the duration of each cell change ($T_{CC}$). The factor f1(K, $T_{CC}$) (e.g. K*$T_{CC}$) may account for the interruption to the signals of cell2 caused by each cell change procedure. For example if T2 is the physical layer measurement period of M2 when no cell change occurs during T2, then T2' can be expressed as: T2'=f2(K, T2, $T_{CC}$). In a specific embodiment, T2' is expressed as: T2'=T2+K*$T_{CC}$.

Extending Same Behavior to Another Type of Multi-RTT Measurement:

According to another embodiment, the UE may be configured with two types of measurements for multi-RTT (e.g., UE Rx-Tx and PRS-RSRP), and the UE determines for a first measurement type (e.g., UE Rx-Tx) the applicable procedure under a cell change according to the rules above and applies the same procedure for the second measurement type (e.g., PRS-RSRP).

Method Adapted for PRS-RSRP Configured without UE Rx-Tx:

According to yet another embodiment, the UE may be configured with PRS-RSRP and a cell change occurs during the measurement period. If the measurement is configured without UE Rx-Tx (e.g., not in the same assistance data or not at all during the PRS-RSRP measurement period), then the PRS-RSRP measurement can continue if the cell change does not concern the measured cell, otherwise the measurement can be restarted. For example, the measured cell was intra-frequency and/or no gaps were needed, while after the cell change the measured cell became inter-frequency and/or gaps are needed—in this case the measurement needs to be restarted and may need to be performed in measurement gaps which need to be also configured for the UE after the cell change (the UE may also need to send a request for the measurement gaps after the cell change).

Operation Tasks:

The UE 102 uses the results of the performed multi-RTT positioning measurement for one or more operational tasks. The measurement results may comprise, for example, a measurement value, information identifying a number of cell changes that occurred during the measurement time period, measurement time period information, the start/end of the measurement, etc. Examples of tasks include: Reporting one or more of the measurement results to one or more nodes (e.g. to the network node such as base station, positioning node, to another UE etc), and using the results for one or more internal procedures in the UE. Examples of such procedures include: determining the UE location, determining UE timing with respect to another node, and logging one or more measurement results for future use (e.g., for MDT, SON, positioning, collecting performance statistics).

Figure 3:
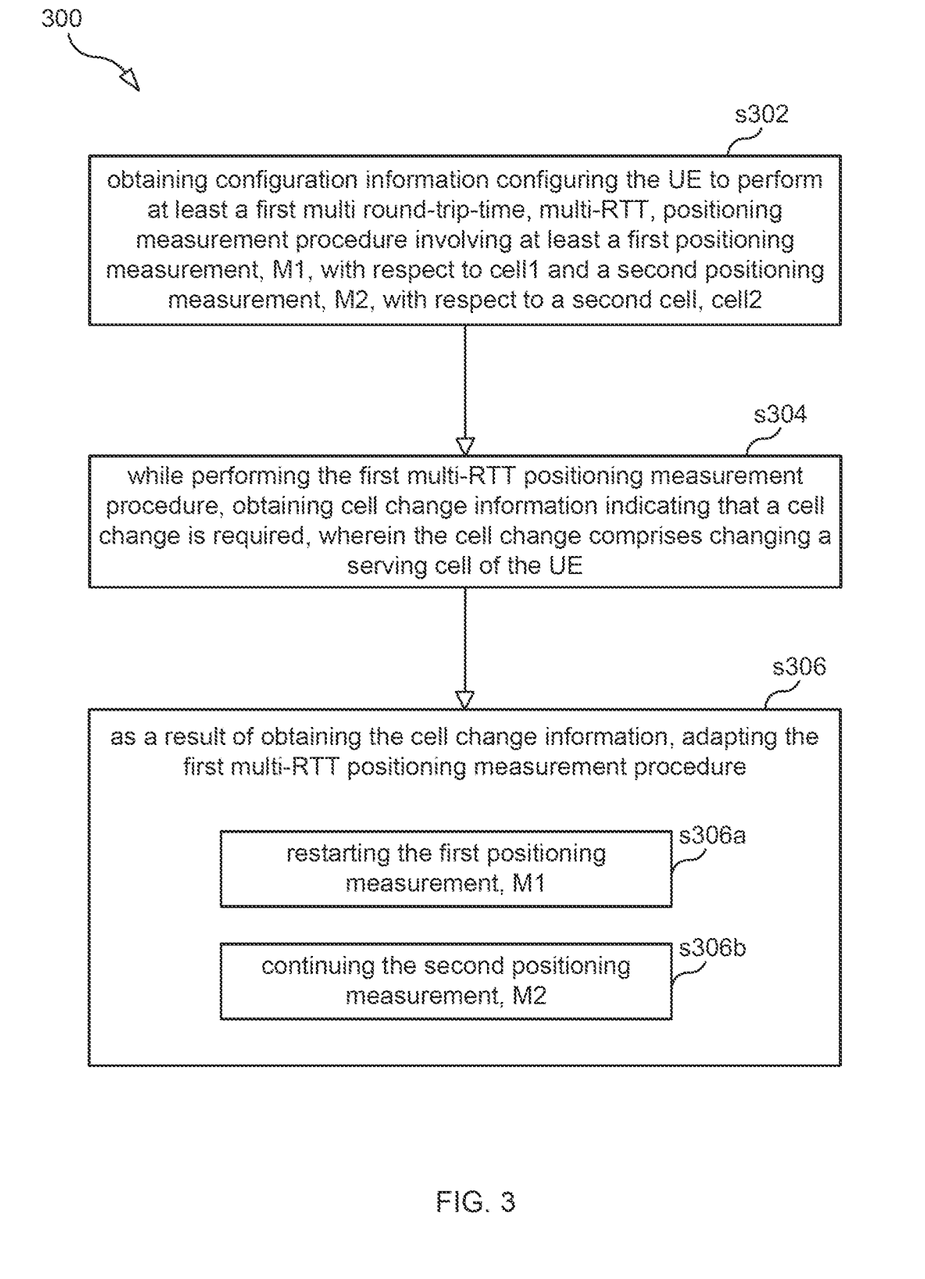
FIG. 3 is a flowchart illustrating a process according to some embodiments.

FIG. 3 is a flowchart illustrating a process 300, according to an embodiment, that is performed by UE 102, which is being served by cell1. Process 300 may begin in step s302. Step s302 comprises the UE the UE obtaining configuration information configuring the UE to perform at least a first multi round-trip-time, multi-RTT, positioning measurement procedure involving at least a first positioning measurement, M1, with respect to cell1 and a second positioning measurement, M2, with respect to a second cell, cell2. Step s304 comprises the UE, while performing the first multi-RTT positioning measurement procedure, obtaining cell change information indicating that a cell change is required, wherein the cell change comprises changing a serving cell of the UE. Step s306 comprises the UE, as a result of obtaining the cell change information, adapting the first multi-RTT positioning measurement procedure. The step of adapting the first multi-RTT positioning measurement procedure comprises: i) the UE restarting the first positioning measurement, M1 (step s306a) and the UE continuing the second positioning measurement, M2 (step s306b).

In some embodiments, adapting the first multi-RTT positioning measurement procedure further comprises: the UE determining whether cell1 belongs to a first group of cells or a second group of cells, and the UE determining whether cell2 belongs to the first group of cells or the second group of cells.

In some embodiments, the UE restarts the first positioning measurement, M1, as a result of determining that the cell1 belongs to the first group of cells, and the UE continues the second positioning measurement, M2, as a result of determining that the cell2 belongs to the second group of cells.

In some embodiments, prior to obtaining the cell change information, the first positioning measurement has a first physical layer measurement period, T1, and the step of adapting the first multi-RTT positioning measurement procedure comprises extending the first physical layer measurement period. In some embodiments, extending the first physical layer measurement period comprises extending the period from T1 to T1', where T1' is equal to 2(T1)+Tcc, where Tcc is a cell change duration.

In some embodiments, prior to obtaining the cell change information, the second positioning measurement has a second physical layer measurement period, T2, and the step of adapting the first multi-RTT positioning measurement procedure comprises extending the second physical layer measurement period. In some embodiments, extending the second physical layer measurement period comprises extending the period from T2 to T2', where T2' is equal to T2+Tcc, where Tcc is a cell change duration.

In some embodiments, the first positioning measurement comprises the UE determining a first UE RX–TX time difference, and the second positioning measurement comprises the UE determining a second UE RX–TX time difference or the UE measuring a reception time of a signal received from cell2.

In some embodiments, the first multi-RTT positioning measurement procedure further involves a third positioning measurement, M3, on a signal of a third cell, cell3.

In some embodiments, obtaining the configuration information comprises receiving a message comprising the configuration information, wherein the message originated from a base station or a positioning node.

Figure 4:
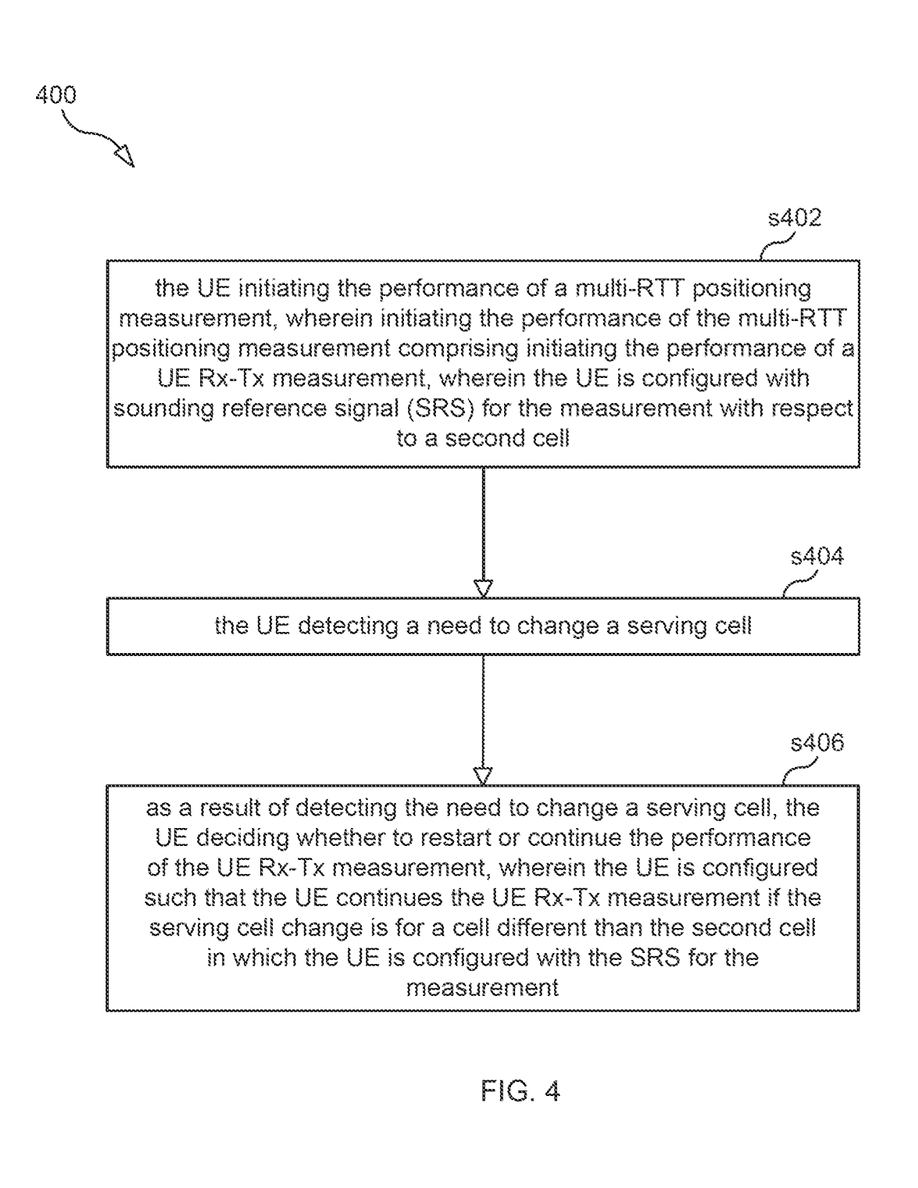
FIG. 4 is a flowchart illustrating a process according to some embodiments.

FIG. 4 is a flowchart illustrating a process 400, according to an embodiment, that is performed by UE 102, which is being served by a first cell. Process 400 may begin in step s402. Step s402 comprises the UE initiating the performance of a multi-RTT positioning measurement, wherein initiating the performance of the multi-RTT positioning measurement comprising initiating the performance of a UE Rx-Tx measurement, wherein the UE is configured with sounding reference signal (SRS) for the measurement with respect to a second cell. Step s404 comprises the UE detecting (s404) a need to change a serving cell. Step s406 comprises the UE, as a result of detecting the need to change a serving cell, deciding whether to restart or continue the performance of the UE Rx-Tx measurement, wherein the UE is configured such that the UE continues the UE Rx-Tx measurement if the serving cell change is for a cell different than the second cell in which the UE is configured with the SRS for the measurement.

In some embodiments process 400 also includes the UE determining that the change is for the cell different than the cell in which the UE is configured with SRS for the measurement; and as a result of determining that the change is for the cell different than the cell in which the UE is configured with SRS for the measurement, the UE continuing the UE Rx-Tx measurement.

In some embodiments the UE is further configured such that the UE restarts the UE Rx-Tx measurement after each cell change if the change is for the cell in which the UE is configured with SRS for the measurement.

In some embodiments the UE is further configured such that, if the UE is configured with both UE Rx-Tx and PRS-RSRP, then the same behavior applies for PRS-RSRP as for the UE Rx-Tx measurement, otherwise, the UE can continue the PRS-RSRP measurement if the change is not to the measured cell.

Figure 5:
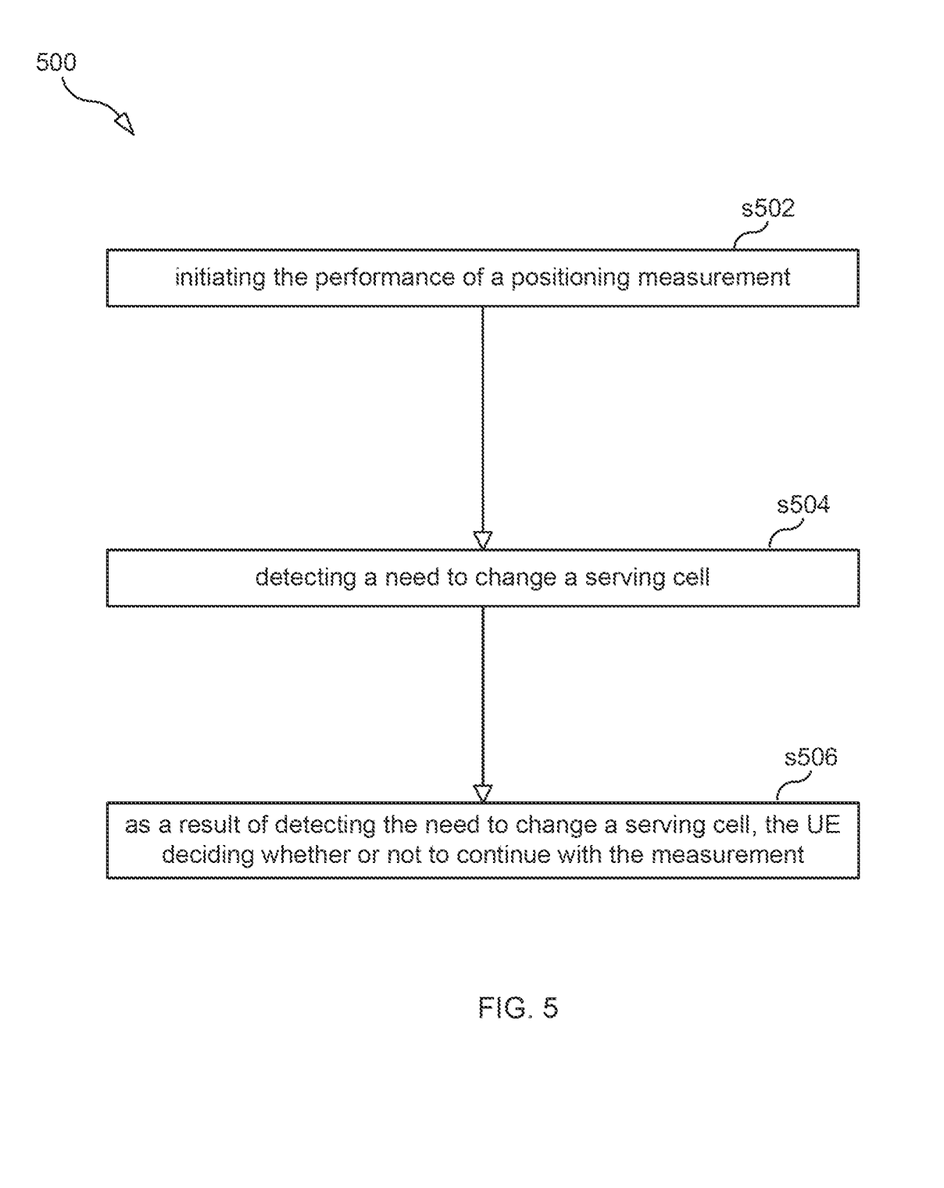
FIG. 5 is a flowchart illustrating a process according to some embodiments.

FIG. 5 is a flowchart illustrating a process 500, according to an embodiment, that is performed by UE 102, which is being served by a first cell. Process 500 may begin in step s502. Step s502 comprises the UE initiating the performance of a positioning measurement. Step s504 comprises the UE detecting a need to change a serving cell. Step s506 comprises as a result of detecting the need to change a serving cell, the UE deciding (s506) whether or not to continue with the measurement. In some embodiments, the positioning measurement is an OTDOA positioning measurement, and initiating the performance of the OTDOA positioning measurement comprising initiating the performance of a Reference Signal Time Difference (RSTD) measurement. In some embodiments, the UE is configured to continue the RSTD measurement after detecting the need to change the serving cell if the new serving cell is on the same carrier frequency (e.g., intra-frequency HO). In some embodiments, the UE is configured to continue the RSTD measurement after detecting the need to change the serving cell if the new serving cell is to a different carrier frequency after which (i) the measured inter-frequency becomes a serving carrier frequency (inter-frequency requirements apply for the measurement), (ii) the measured inter-frequency remains inter-frequency (inter-frequency requirements apply for the measurement), and/or (iii) the measured intra-frequency becomes inter-frequency (inter-frequency requirements apply for the measurement).

3. Multi-RTT Positioning Measurements Period Under a Cell Change

As described above, when performing multi-RTT positioning measurement(s), the UE may need to change a serving cell, e.g., due to HO, reconfiguring PSCell, switching SCells, or even a change in a set of serving cells (e.g., addition/release of PSCell or SCell or (de)activation of SCells). In this case, the UE needs to decide whether to restart or continue these measurement(s). Accordingly, in one embodiment, the UE is configured as follows:

(1) The UE restarts the UE Rx-Tx measurement after each cell change if the change is, e.g., for the cell in which the UE is configured with SRS for the measurement.

(2) The UE continues the UE Rx-Tx measurement if the change is, e.g., for the cell different than the cell in which the UE is configured with SRS for the measurement.

(3) If the UE is configured with both UE Rx-Tx and PRS-RSRP, then the same behavior applies for PRS-RSRP as for the UE Rx-Tx measurement. Otherwise, the UE can continue the PRS-RSRP measurement if the change is not to the measured cell.

4. Observed Time Difference of Arrival (OTDOA) Positioning Measurements

When performing OTDOA positioning measurement(s), the UE may need to change a serving cell, e.g., due to HO, reconfiguring PSCell, or switching SCells. In this case, the UE needs to decide how to continue with the measurement(s). Accordingly, in one embodiment, the UE is configured as follows: the UE continues Reference Signal Time Difference (RSTD) measurement after each serving cell change which is (A) on the same carrier frequency (e.g., intra-frequency HO), or (B) to a different carrier frequency after which (i) the measured inter-frequency becomes a serving carrier frequency (inter-frequency requirements apply for the measurement), (ii) the measured inter-frequency remains inter-frequency (inter-frequency requirements apply for the measurement), (iii) the measured intra-frequency becomes inter-frequency (inter-frequency requirements apply for the measurement). The same behavior applies also for PRS-RSRP.

Figure 6:
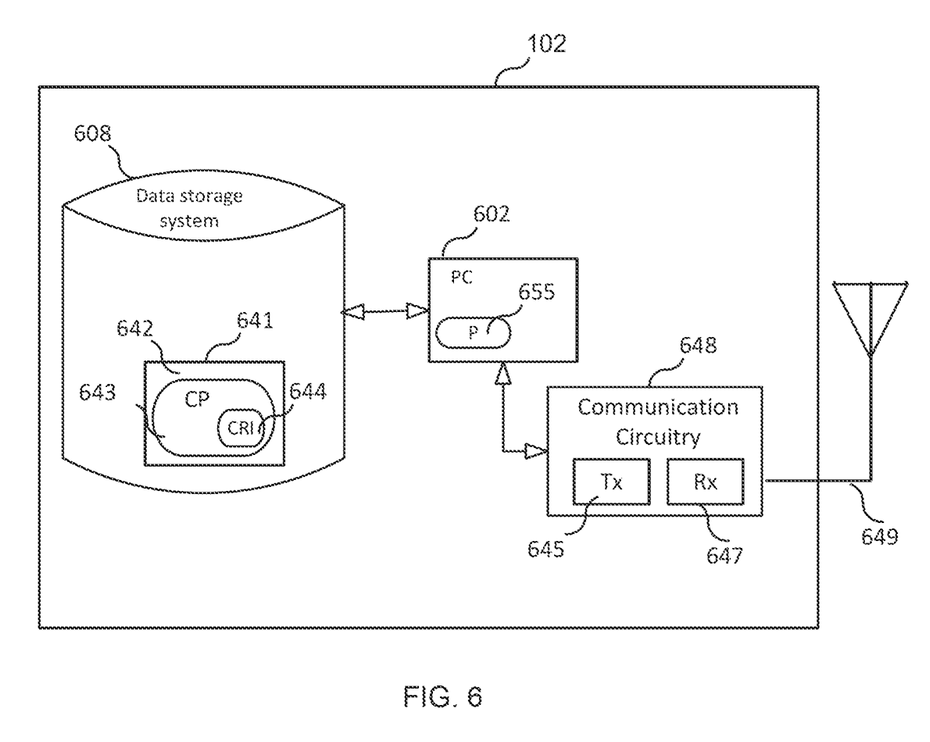
FIG. 6 is a block diagram of a UE according to some embodiments.

FIG. 6 is a block diagram of UE 102, according to some embodiments. As shown in FIG. 6, UE 102 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like); communication circuitry 648, which is coupled to an antenna arrangement 649 comprising one or more antennas and which comprises a transmitter (Tx) 645 and a receiver (Rx) 647 for enabling UE 102 to transmit data and receive data (e.g., wirelessly transmit/receive data); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes UE 102 to perform steps described herein (e.g., steps described herein with reference to the flow charts). In other embodiments, UE 102 may be configured to perform steps described herein without the need for code. That is, for example, PC 602 may consist merely of one or more ASICs. Hence, the features of the embodiments described herein may be implemented in hardware and/or software.

The following is a summary of various embodiments described herein.

A1. A method (300, see FIG. 3) performed by a user equipment, UE, that is being served by at least a first cell, cell1, the method comprising: the UE obtaining (s302) configuration information configuring the UE to perform at least a first multi round-trip-time, multi-RTT, positioning measurement procedure involving at least a first positioning measurement, M1, with respect to cell1 and a second positioning measurement, M2, with respect to a second cell, cell2; the UE, while performing the first multi-RTT positioning measurement procedure, obtaining (s304) cell change information indicating that a cell change is required, wherein the cell change comprises changing a serving cell of the UE; and as a result of obtaining the cell change information, the UE adapting (s306) the first multi-RTT positioning measurement procedure, wherein adapting the first multi-RTT positioning measurement procedure comprises: i) restarting (s306a) the first positioning measurement, M1; and ii) continuing (s306b) the second positioning measurement, M2.

A2. The method of embodiment A1, wherein adapting the first multi-RTT positioning measurement procedure further comprises: the UE determining whether cell1 belongs to a first group of cells or a second group of cells, and the UE determining whether cell2 belongs to the first group of cells or the second group of cells.

A3. The method of embodiment A2, wherein the UE restarts the first positioning measurement, M1, as a result of determining that the cell1 belongs to the first group of cells, and the UE continues the second positioning measurement, M2, as a result of determining that the cell2 belongs to the second group of cells.

A4. The method of any one of embodiments A1-A3, wherein, prior to obtaining the cell change information, the first positioning measurement has a first physical layer measurement period, T1, and the step of adapting the first multi-RTT positioning measurement procedure comprises extending the first physical layer measurement period.

A5. The method of embodiment A4, wherein extending the first physical layer measurement period comprises extending the period from T1 to T1', where T1' is equal to 2(T1)+Tcc, where Tcc is a cell change duration.

A6. The method of any one of embodiments A1-A5, wherein, prior to obtaining the cell change information, the second positioning measurement has a second physical layer measurement period, T2, and the step of adapting the first multi-RTT positioning measurement procedure comprises extending the second physical layer measurement period.

A7. The method of embodiment A6, wherein extending the second physical layer measurement period comprises extending the period from T2 to T2', where T2' is equal to T2+Tcc, where Tcc is a cell change duration.

A8. The method of any one of embodiments A1-A7, wherein the first positioning measurement comprises the UE determining a first UE RX–TX time difference, and the second positioning measurement comprises the UE determining a second UE RX–TX time difference or the UE measuring a reception time of a signal received from cell2.

A9. The method of any one of embodiments A1-A8, wherein the first multi-RTT positioning measurement procedure further involves a third positioning measurement, M3, on a signal of a third cell, cell3.

A10. The method of any one of embodiments A1-A9, wherein obtaining the configuration information comprises receiving a message comprising the configuration information, wherein the message originated from a base station or a positioning node.

A11. A method (400) performed by a UE (102) that is being served by at least a first cell, the method comprising: the UE initiating (s402) the performance of a multi-RTT positioning measurement, wherein initiating the performance of the multi-RTT positioning measurement comprising initiating the performance of a UE Rx-Tx measurement, wherein the UE is configured with sounding reference signal (SRS) for the measurement with respect to a second cell; the UE detecting (s404) a need to change a serving cell; and as a result of detecting the need to change a serving cell, the UE deciding (s406) whether to restart or continue the performance of the UE Rx-Tx measurement, wherein the UE is configured such that the UE continues the UE Rx-Tx measurement if the serving cell change is for a cell different than the second cell in which the UE is configured with the SRS for the measurement.

A12. The method of embodiment A11, further comprising: the UE determining that the change is for the cell different than the cell in which the UE is configured with SRS for the measurement; and as a result of determining that the change is for the cell different than the cell in which the UE is configured with SRS for the measurement, the UE continuing the UE Rx-Tx measurement.

A13. The method of embodiment A11 or A12, wherein the UE is further configured such that: the UE restarts the UE Rx-Tx measurement after each cell change if the change is for the cell in which the UE is configured with SRS for the measurement.

A14. The method of embodiment A11, A12, or A13, wherein the UE is further configured such that, if the UE is configured with both UE Rx-Tx and PRS-RSRP, then the same behavior applies for PRS-RSRP as for the UE Rx-Tx measurement, otherwise, the UE can continue the PRS-RSRP measurement if the change is not to the measured cell.

A15. A method (500) performed by a UE (102), the method comprising: the UE initiating (s502) the performance of a positioning measurement; the UE detecting (s504) a need to change a serving cell; and as a result of detecting the need to change a serving cell, the UE deciding (s506) whether or not to continue with the measurement.

A16. The method of embodiment A15, wherein the positioning measurement is an OTDOA positioning measurement, and initiating the performance of the OTDOA positioning measurement comprising initiating the performance of a Reference Signal Time Difference (RSTD) measurement.

A17. The method of embodiment A16, wherein the UE is configured to continue the RSTD measurement after detecting the need to change the serving cell if the new serving cell is on the same carrier frequency (e.g., intra-frequency HO).

A18. The method of embodiment A16, wherein the UE is configured to continue the RSTD measurement after detecting the need to change the serving cell if the new serving cell is to a different carrier frequency after which (i) the measured inter-frequency becomes a serving carrier frequency (inter-frequency requirements apply for the measurement), (ii) the measured inter-frequency remains inter-frequency (inter-frequency requirements apply for the measurement), and/or (iii) the measured intra-frequency becomes inter-frequency (inter-frequency requirements apply for the measurement).

A19. A method (400) performed by a UE (102) that is being served by at least a first cell, the method comprising: the UE performing a multi round-trip-time, multi-RTT, positioning measurement, wherein the UE is configured with sounding reference signal (SRS) for the measurement with respect to a second cell; the UE detecting (s404) a need to change a serving cell; and as a result of detecting the need to change a serving cell, the UE deciding (s406) whether to restart or continue performing the multi-RTT measurement, wherein the UE is configured such that the UE continues the multi-RTT measurement if the serving cell change is for a cell different than the second cell in which the UE is configured with the SRS for the measurement.

A20. The method of embodiment A19, further comprising: the UE obtaining (s302) configuration information configuring the UE to perform the multi-RTT measurement.

A21. The method of embodiment A19 or A20, wherein the multi-RTT positioning measurement is a UE Rx-Tx measurement.

B1. A computer program (643) comprising instructions (644) which when executed by processing circuitry (602) causes the processing circuitry (602) to perform the method of any one of embodiments A1-A21.

B2. A carrier containing the computer program of embodiment B1, wherein the carrier is one of an electronic signal, an optical signal, a radio signal, and a computer readable storage medium (642).

C1. A user equipment, UE (102), the UE being adapted to perform the method of any one of the embodiments disclosed above.

D1. A user equipment, UE (102), the UE comprising: processing circuitry (602); and a memory (642), said memory containing instructions (644) executable by said processing circuitry, whereby said apparatus is adapted to perform the method of any one of the embodiments disclosed above.

While various embodiments are described herein (including the Appendices, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment, UE that is being served by at least a first cell, cell1, the method comprising:

the UE obtaining configuration information configuring the UE to perform at least a first multi round-trip-time, multi-RTT, positioning measurement procedure involving at least a first positioning measurement, M1, with respect to cell1 and a second positioning measurement, M2, with respect to a second cell, cell2;

the UE, while performing the first multi-RTT positioning measurement procedure, obtaining cell change information indicating that a cell change is required, wherein the cell change comprises changing a serving cell of the UE; and as a result of obtaining the cell change information, the UE adapting the first multi-RTT positioning measurement procedure, wherein adapting the first multi-RTT positioning measurement procedure comprises:

i) restarting the first positioning measurement, M1; and ii) continuing the second positioning measurement, M2, wherein prior to obtaining the cell change information, the first positioning measurement has a first physical layer measurement period, T1, adapting the first multi-RTT positioning measurement procedure comprises extending the first physical layer measurement period, and extending the first physical layer measurement period comprises extending the period from T1 to T1', where T1' is equal to 2 (T1)+Tcc, where Tcc is a cell change duration.

2. The method of claim 1, wherein adapting the first multi-RTT positioning measurement procedure further comprises:

the UE determining whether cell1 belongs to a first group of cells or a second group of cells, and the UE determining whether cell2 belongs to the first group of cells or the second group of cells.

3. The method of claim 2, wherein the UE restarts the first positioning measurement, M1, as a result of determining that the cell1 belongs to the first group of cells, and the UE continues the second positioning measurement, M2, as a result of determining that the cell2 belongs to the second group of cells.

4. The method of claim 1, wherein, prior to obtaining the cell change information, the second positioning measurement has a second physical layer measurement period, T2, and the step of adapting the first multi-RTT positioning measurement procedure comprises extending the second physical layer measurement period.

5. The method of claim 4, wherein extending the second physical layer measurement period comprises extending the period from T2 to T2', where T2' is equal to T2+Tcc, where Tcc is a cell change duration.

6. The method of claim 1, wherein the first positioning measurement comprises the UE determining a first UE RX–TX time difference, and the second positioning measurement comprises the UE determining a second UE RX–TX time difference or the UE measuring a reception time of a signal received from cell2.

7. The method of claim 1, wherein the first multi-RTT positioning measurement procedure further involves a third positioning measurement, M3, on a signal of a third cell, cell3.

8. The method of claim 1, wherein obtaining the configuration information comprises receiving a message comprising the configuration information, wherein the message originated from a base station or a positioning node.

9. A user equipment, UE, the UE being adapted to:
   obtain configuration information configuring the UE to perform at least a first multi round-trip-time, multi-RTT, positioning measurement procedure involving at least a first positioning measurement, M1, with respect to cell1 and a second positioning measurement, M2, with respect to a second cell, cell2;
   while performing the first multi-RTT positioning measurement procedure, obtain cell change information indicating that a cell change is required, wherein the cell change comprises changing a serving cell of the UE; and
   as a result of obtaining the cell change information, adapt the first multi-RTT positioning measurement procedure, wherein the UE is configured to adapt the first multi-RTT positioning measurement procedure by:
   i) restarting the first positioning measurement, M1; and
   ii) continuing the second positioning measurement, M2, wherein
   prior to obtaining the cell change information, the first positioning measurement has a first physical layer measurement period, T1
   adapting the first multi-RTT positioning measurement procedure comprises extending the first physical layer measurement period, and
   extending the first physical layer measurement period comprises extending the period from T1 to T1', where T1' is equal to 2(T1)+Tcc, where Tcc is a cell change duration.

* * * * *